(12) United States Patent
Vladimirovitch et al.

(10) Patent No.: US 9,608,820 B2
(45) Date of Patent: Mar. 28, 2017

(54) MOBILE TERMINAL, RESTRICTING SYSTEM AND METHOD OF ACCESSING AN INFORMATION USING THE MOBILE TERMINAL

(75) Inventors: Nazarov Yury Vladimirovitch, Seoul (KR); Eunyoung Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 1565 days.

(21) Appl. No.: 12/316,425

(22) Filed: Dec. 12, 2008

(65) Prior Publication Data
US 2010/0064376 A1    Mar. 11, 2010

(30) Foreign Application Priority Data
Sep. 11, 2008   (KR) ................ 10-2008-0089616

(51) Int. Cl.
| | |
|---|---|
| G06F 7/04 | (2006.01) |
| G06F 17/30 | (2006.01) |
| H04L 9/32 | (2006.01) |

(52) U.S. Cl.
CPC .......... *H04L 9/32* (2013.01); *H04L 2209/805* (2013.01)

(58) Field of Classification Search
CPC ....................................................... G06F 21/10
USPC ........................................ 705/50–79; 726/28
See application file for complete search history.

(56) References Cited

U.S. PATENT DOCUMENTS

| | | | | |
|---|---|---|---|---|
| 2004/0029563 A1 * | 2/2004 | Berg | ................. | G07C 9/00007 455/410 |
| 2004/0190718 A1 * | 9/2004 | Dacosta | ....................... | 380/247 |
| 2006/0120526 A1 * | 6/2006 | Boucher | ............ | G06F 21/6218 380/247 |
| 2006/0242065 A1 | 10/2006 | Jogand-Coulomb et al. | | |
| 2007/0057038 A1 * | 3/2007 | Gannon | ....................... | 235/380 |
| 2007/0283420 A1 * | 12/2007 | Rantalahti | ............... | G06F 21/10 726/4 |

FOREIGN PATENT DOCUMENTS

| | | | | |
|---|---|---|---|---|
| KR | 10-2006-0060392 | 6/2006 | | |
| NO | WO 2005096651 A1 * | 10/2005 | ............ | H04W 88/02 |
| WO | 2005-096651 | 10/2005 | | |

OTHER PUBLICATIONS

Korean Intellectual Property Office Application Serial No. 10-2008-0089616, Office Action dated Jul. 25, 2014, 5 pages.

* cited by examiner

*Primary Examiner* — James A Reagan
(74) *Attorney, Agent, or Firm* — Lee Hong Degerman Kang & Waimey

(57) ABSTRACT

The exemplary embodiment relates to a system and method for restricting the disclosure of information employing a mobile terminal, which restricts the disclosure of information using a mobile terminal. In an aspect, the exemplary embodiment provides a mobile terminal, including a short-range communication module performing the short-range communication channel, memory storing authorization information for allowing access to unaccessible information stored in the information device, and a controller transmitting the authorization information through the short-range communication module.

19 Claims, 11 Drawing Sheets

MOBILE TERMINAL, RESTRICTING SYSTEM AND METHOD OF ACCESSING AN INFORMATION USING THE MOBILE TERMINAL

CROSS-REFERENCE TO RELATED APPLICATIONS

This application claims the benefit of earlier filing date and right of priority to Korean Patent Application No. 10-2008-0089616filed on Sep. 11, 2008, the contents of which are incorporated herein by reference for all purposes as if fully set forth herein.

FIELD OF THE INVENTION

The exemplary embodiment relates to a system and method for restricting the disclosure of information employing a mobile terminal, which restricts the disclosure of information using a mobile terminal.

DISCUSSION OF THE RELATED ART

As the functionality of information devices, such as personal computers, notebooks, and mobile phones, is diversified, the information devices have been implemented in the form of multimedia players equipped with complex functions, such as capturing images and video, playing music or video files, game, and reception of broadcast.

Information devices can be divided into mobile terminals and stationary terminals according to whether they are movable. Mobile terminals can be divided into handheld terminals and vehicle mount terminals according to whether they can be directly carried on by a user.

Meanwhile, recently, computers are provided at public places as well as homes and offices. Information stored in such computers can include information requiring security. However, information stored in computers is likely to be accessed by unwanted persons unless additional security measures, such as setting of a password in an application for executing the information, are taken.

In order to restrict digital information, digital rights management technologies have been applied to commercial writings, etc. Such digital rights management technologies are generally employed in electronic authorization of commercial writing information and have been developed on the basis of network or mobile communication network access, and should be assigned authorization information by authentication institutes.

SUMMARY OF THE INVENTION

The exemplary embodiment provides a system and method for restricting the disclosure of information using a mobile terminal, which restrict access of information stored in various information devices, such as computers, by employing a mobile terminal.

In accordance with an aspect of the exemplary embodiment, there is provided a mobile terminal, including a short-range communication module performing the short-range communication channel, memory storing authorization information for allowing access to unaccessible information stored in the information device, and a controller transmitting the authorization information through the short-range communication module.

In accordance with another aspect of the exemplary embodiment, a system for restricting disclosure of information employing a mobile terminal includes a mobile terminal, including a first short-range communication module establishing a short-range communication channel, memory storing authorization information, and a controller transmitting the authorization information through the short-range communication module, and an information device, including a second short-range communication module establishing the short-range communication channel, and a control module changing unaccessible information to accessible information in response to authorization information received through the short-range communication channel.

The control module further comprises an encryption module, which encrypts the unaccessible information and decrypts the encrypted unaccessible information using a key included in the authorization information when the authorization information is received.

The information device further comprises memory storing terminal information of the mobile terminal.

The control module verifies validity of the authorization information by comparing terminal information of the mobile terminal, which is included in the authorization information, and terminal information stored in the memory.

The e memory further stores user passwords.

The control module verifies validity of the authorization information by comparing terminal information of the mobile terminal, which is included in the authorization information, and terminal information stored in the memory, verifies validity of a password input by a user through an input device by comparing the password input by the user and a user password stored in the memory, and changes the unaccessible information to the accessible information when the authorization information and the password are valid.

When it is determined that plural pieces of authorization information is received through the short-range communication channel, the control module changes unaccessible information, which corresponds to any one authorization information selected by a user, to accessible information.

When a received signal intensity of authorization information received through the short-range communication channel is over a specific threshold value, the control module changes the unaccessible information to the accessible information.

The unaccessible information includes an information file whose attribute is set to "hiding" and playback, transfer, and copy are prohibited, and the accessible information includes an information file whose attribute is set to "read and write" and playback, transfer, and copy are allowed.

According to further another aspect of the exemplary embodiment, a method for restricting disclosure of information employing a mobile terminal, including transmitting authorization information of the mobile terminal to the information device through a short-range communication channel, and the information device changing unaccessible information to accessible information when the authorization information is received.

BRIEF DESCRIPTION OF THE DRAWINGS

The above and other aspects, features, and advantages of the exemplary embodiment will become more apparent upon consideration of the following description of preferred embodiments, taken in conjunction with the accompanying drawing figures.

DETAILED DESCRIPTION OF PREFERRED EMBODIMENTS

Figure 1:
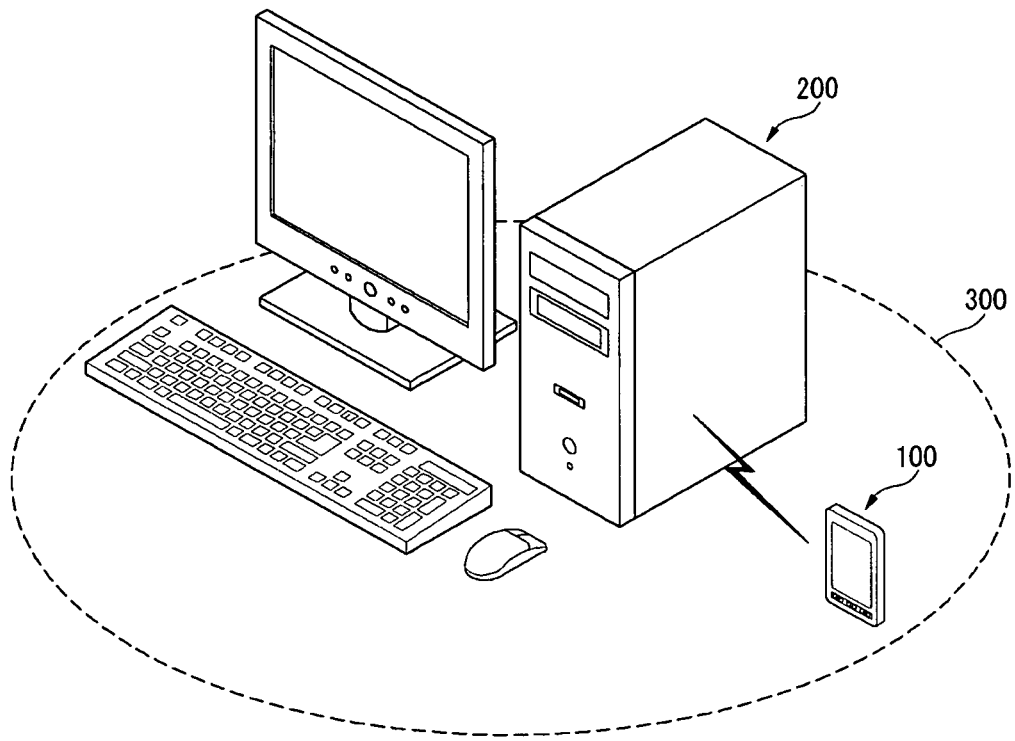
FIG. 1 is a diagram showing a system for restricting the disclosure of information according to an embodiment of the exemplary embodiment.

Merits and characteristics of the invention, and methods for accomplishing them will become more evident from the following description taken in conjunction with the accompanying drawings. The exemplary embodiment will now be described in detail in connection with specific embodiments with reference to the accompanying drawings. Wherever possible, the same reference numbers will be used throughout the drawings to refer to the same or similar parts. Further, in describing the exemplary embodiment, detailed description on the known functions and constructions will be omitted if they are deemed to make the gist of the exemplary embodiment unnecessarily vague.

Before description of the embodiments, terminologies used in the following embodiments are defined schematically.

An information device may refer to all information devices or systems, such as computers, video players, and audio player, which can store (or record), play (or read), move and copy information. Information that can be stored in the information devices may include text information, video information, audio information or complex information thereof, and the like. The video information includes all pieces of information, which is displayed as visual information, such as still image information which is received via information devices and stored in information devices, broadcast signals, and video information stored in information devices. The audio information includes all pieces of information such as MP3 and voice recording information, which is played as sound.

Access of information refers to play, transfer, copy, etc. by hardware and/or software applications through verification of authorization information from mobile terminals. The access of information also includes converting the attribute of information into attributes "read and write" so that the information can be seen on a display of an information device.

Unaccessible state of information refers to information access prohibition measures, including hiding, playback, execution, transfer, copy, etc. of information files without authorizing authorization information from mobile terminals with respect to information selected as unaccessible information by a user. The hiding of an information file is to set the attribute of the information file to hiding so that the information file is not seen in an operating system (OS) of an information device.

Encryption includes a process of encrypting unaccessible information selected by a user by employing encryption techniques, such as asymmetrical encryption and symmetrical key encryption. Decryption includes a process of decoding encrypted and unaccessible information using a key received from a mobile terminal. The asymmetrical key encryption technology is also called "public key encryption" and is an encryption scheme in which a key necessary for data encryption and a key necessary for data decryption are comprised of different keys. The symmetrical key encryption technology is also called "secret key encryption" and is an encryption scheme in which a key necessary for data encryption and a key necessary for data decryption are comprised of the same key.

A mobile terminal related to the exemplary embodiment will now be described in detail with reference to the accompanying drawings. It is to be noted that the suffixes of constituent elements used in the following description, such as "module" and "unit", are simply used by considering the easiness of writing this specification, but are not particularly given importance and roles. Accordingly, the terminologies "module" and "unit" can be mixed in use.

A system and method for restricting the disclosure of information using a mobile terminal according to embodiments of the exemplary embodiment is described with reference to FIGS. 1 to 11.

Referring to FIG. 1, a system for restricting the disclosure of information according to an embodiment of the exemplary embodiment may include an information device 200 and a mobile terminal 100 that performs short-range communications.

The information device 200 of the exemplary embodiment may include an input device module, an output device module, a memory module, a short-range communication module, an authorization processing module, an encryption module, and a control module.

The input device module of the information device 200 includes an user interface, such as a remote controller, an infrared receiving unit, a keypad, a keyboard, and a mouse, and is configured to receive information or commands input from a user.

The output device module of the information device 200 includes a display such as a monitor, an audio output unit such as a speaker, and so on and is configured to play accessible information stored in the information device 200 under the control of the control module.

The memory module of the information device 200 may store all pieces of information which can be changed to accessible state and unaccessible state. The memory module stores terminal information (i.e., user information) of a mobile terminal having accessible authority of information, and an information file history in which information is classified on a per user basis and set to closing. The memory module may store user passwords necessary to change unaccessible information to accessible information.

The short-range communication module of the information device 200 performs short-range communications with the mobile terminal 100 and is configured to transmit authorization information, which is received from the mobile terminal 100, to the control module and the information processing module over a preset receiving intensity under the control of the control module. Short-range communication schemes applicable to the short-range communication module may include Bluetooth, radio frequency identification (RFID), infrared data association (IrDA), ultra-wideband (UWB), ZigBee, to name a few.

The authorization processing module of the information device 200 is configured to decode authorization information received through the short-range communication module and compare mobile terminal information, included in the authorization information, with mobile terminal information included in the memory module in order to determine whether to permit authorization. The authorization processing module of the information device supplies a key, which is included in authorization information received through the short-range communication module, to the encryption module.

The encryption module of the information device 200 is configured to perform encryption on some pieces of unaccessible information, which has been designated as an encryption process by a user, of the pieces of unaccessible information and decrypt compressed and unaccessible information using a key from the authorization processing module.

The control module of the information device 200 is configured to control an overall operation of components included in the information device and perform a closing process on pieces of unaccessible information selected by a user.

The mobile terminal 100 of the exemplary embodiment may include mobile phones, smart phones, notebooks computers, terminals for digital broadcast, personal digital assistants (PDA), portable multimedia players (PMP), navigators, and so on.

The mobile terminal 100 may include a wireless communication unit 110, an audio/video (A/V) input unit 120, a user input unit 130, a sensing unit 140, an output unit 150, memory 160, an interface unit 170, a controller 180, a power supply 190 and the like. The components shown in FIG. 2 are not indispensable, but it is understood that a mobile terminal having greater or fewer components may alternatively be implemented.

The mobile terminal 100 transmits encrypted authorization information to the information device 200 through a short-range communication channel when the short-range communication channel with the information device 200 is activated. The authorization information may be created, updated and deleted within the mobile terminal 100 by a user and may be created, updated and deleted according to commands and data input from the information device 200 when a communication channel is established between the information device 200 and the mobile terminal 100. The authorization information includes a key necessary for decryption along with terminal information of the mobile terminal 100.

Figure 2:
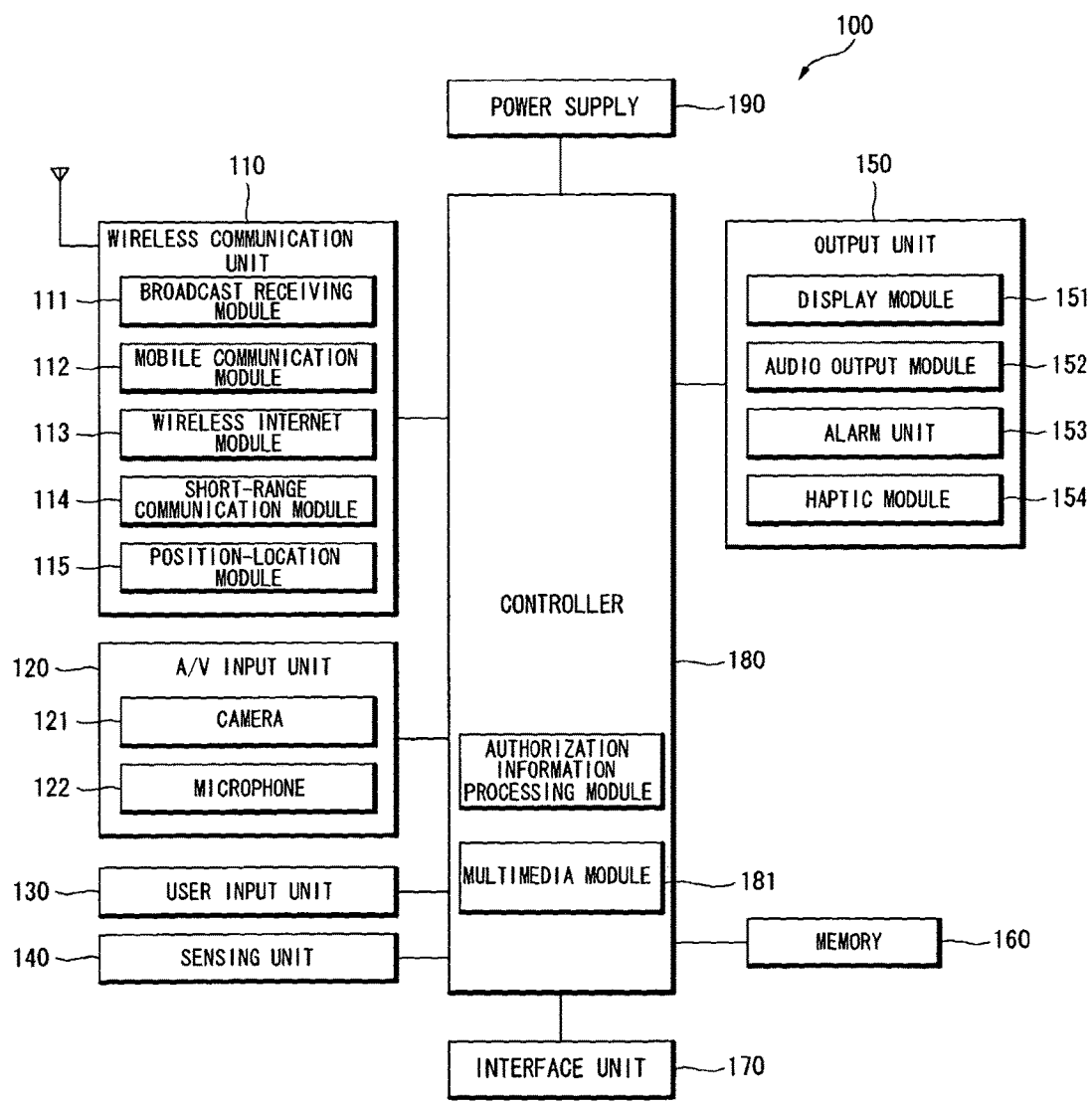
FIG. 2 is a block diagram of a mobile terminal related to an embodiment of the exemplary embodiment.

FIG. 2 is a detailed block diagram of the mobile terminal 100.

Referring to FIG. 2, the wireless communication unit 110 of the mobile terminal 100 may include one or more modules, enabling wireless communications between the mobile terminal 100 and a wireless communication system or between the mobile terminal 100 and a network where the mobile terminal 100 is located. For example, the wireless communication unit 110 may include a broadcast receiving module 111, a mobile communication module 112, a wireless Internet module 113, a short-range communication module 114, a position-location module 115, and so on.

The broadcast receiving module 111 receives broadcast signals and/or broadcast associated information from an external broadcast managing entity via a broadcast channel.

The broadcast channel may include a satellite channel and a terrestrial channel. The broadcast managing entity refers generally to a system, which generates and transmits broadcast signals and/or broadcast associated information, or a system, which receives previously generated broadcast signals and/or broadcast associated information and provides them to a terminal. The broadcast signals may be implemented as TV broadcast signals, radio broadcast signals, and data broadcast signals, among others. If desired, the broadcast signals may further include broadcast signals combined with TV or radio broadcast signals.

The broadcast associated information may refer to information associated with a broadcast channel, a broadcast program or a broadcast service provider. The broadcast associated information may also be provided via a mobile communication network. In this case, the broadcast associated information may be received by the mobile communication module 112.

The broadcast associated information may exist in various forms. For instance, the broadcast associated information may include an electronic program guide (EPG) of digital multimedia broadcasting (DMB), electronic service guide (ESG) of digital video broadcast-handheld (DVB-H) or the like.

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), media forward link only (MediaFLO®), digital video broadcast-handheld (DVB-H), and integrated services digital broadcast-terrestrial (ISDB-T). It is also to be understood that the broadcast receiving module 111 may be configured to be suitable for other broadcast systems, which provide broadcast signals, as well as the digital broadcast systems.

The broadcast signal and/or broadcast associated information received via the broadcast receiving module 111 may be stored in the memory 160.

The mobile communication module 112 transmits/receives radio signals to/from a base station, an external terminal, and an entity over a mobile communication network. The radio signals may include various forms of data according to transmission/reception of voice call signals, video telephony call signals and text/multimedia messages.

The wireless Internet module 113 refers to a module for wireless Internet access. This module may be internally or externally coupled to the mobile terminal 100. Wireless Internet technologies may include wireless LAN (WLAN)

(Wi-Fi), wireless broadband (Wibro), world interoperability for microwave access (Wimax), high-speed downlink packet access (HSDPA), and so on.

The short-range communication module 114 refers to a module for short-range communications. Suitable short-range communication technologies may include Bluetooth, radio frequency identification (RFID), infrared data association (IrDA), ultra-wideband (UWB), ZigBee, to name a few.

The position-location module 115 is a module for identifying or otherwise obtaining the location of a mobile terminal. A representative one of examples of the position-location module 115 includes a global positioning system (GPS). According to the current technology, the GPS module 115 can calculate three-dimensional position information on the basis of latitude, longitude, and altitude with respect to one point (object) on a specific time by calculating information about the distance of the one point (object) from three or more satellites and information about the time where the distance information was measured and then applying trigonometry to the calculated distance information. A method of calculating position and time information using three satellites and modifying error of the calculated position and time information using another satellite is also used. The GPS module 115 also continues to calculate a current location in real-time and calculates velocity information based on the current location.

The A/V input unit 120 is configured to input audio or video signals. The A/V input unit 120 may include a camera 121, a microphone 122 and the like. The camera 121 receives and processes image frames of still pictures or video obtained by an image sensor in a video call mode or a photographing mode. The processed image frames may be displayed on the display 151.

The image frames processed in the camera 121 may be stored in the memory 160 or transmitted to the outside via the wireless communication unit 110. Two or more cameras 121 may be included according to the configuration aspect of a terminal. The camera 121 may be used as a sensor for sensing a change in the position of a user's head and eyes when a menu comprised of three-dimensional graphic images is displayed on the display of the mobile terminal 100.

The microphone 122 receives external sound signals via the microphone in mode, such as a phone call mode, a recording mode, and a voice recognition mode, and processes the sound signals into electrical voice data. The processed voice data can be converted into a form, which can be transmitted to a mobile communication base station through the mobile communication module 112 in the case of a phone call mode, and then output. Various noise removing algorithms for removing noise occurring in the course of receiving external sound signals may be implemented in the microphone 122.

The user input unit 130 generates input data responsive to user manipulation of an associated terminal or terminals. Examples of the user input unit 130 may include a keypad, a dome switch, a touchpad (e.g., static pressure/capacitance), a jog wheel, a jog switch, etc.

The sensing unit 140 senses a current status of the mobile terminal 100 and generates a sensing signal for controlling an operation of the mobile terminal 100. For instance, the sensing unit 140 may detect open/closed status of the mobile terminal 100, a position of the mobile terminal 100, a presence or absence of user contact with the mobile terminal, orientation of the mobile terminal, acceleration/deceleration of the mobile terminal, and so on. As an example, in the case in which the mobile terminal 100 is configured as a slide-type mobile terminal, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. Meanwhile, the sensing unit 140 may include a proximity sensor. The sensing unit 140 may include an angular sensor for sensing an angle change of the mobile terminal.

The output unit 150 is configured to generate outputs associated with the sense of sight, the sense of hearing, tactile sense, and so on and may include a display 151, an audio output module 152, an alarm unit 153, a haptic module 154 and the like.

The display unit 151 displays information processed in the mobile terminal 100. For example, when the mobile terminal is in a phone call mode, the display unit 151 displays a user interface (UI) or a graphic user interface (GUI), etc., which is associated with a phone call. When the mobile terminal 100 is in a video call mode or a photographing mode, the display unit 151 displays photographed and/or received images.

The display 151 may be implemented using known display technologies including, for example, a liquid crystal display (LCD), a thin film transistor-liquid crystal display (TFT-LCD), an organic light-emitting diode display (OLED), a flexible display and a three-dimensional display. Some of the displays may be configured in a transparent type or a light-transmitting type, enabling the outside to be seen therethrough. This may be called a transparent display. Representative examples of the transparent display may include a transparent LCD, etc. Some of the displays may also be configured in a rear-side structure or light-transmitting type of the display 151. Such configurations enable a user to see objects located in the rear of a terminal body through an area occupied by the display 151 of the terminal body.

Two or more displays 151 may exist according to the configuration type of the mobile terminal 100. For example, a plurality of the displays may be arranged with them being spaced apart from each other or integrally on one surface of the mobile terminal 100 and arranged on different surfaces of the mobile terminal 100. Here, a three-dimensional user interface, which will be described later on, may be displayed on each of the displays.

In the case in which the display 151 and a sensor for sensing a touch operation (hereinafter referred to as a 'touch sensor') constitute a mutual layered structure (hereinafter referred to as a 'touch screen'), the display 151 may also be used as an input device as well as an output device. The touch sensor may have a form such as a touch film, a touch sheet, and a touch pad.

The touch sensor may be configured to convert a change in the pressure applied to a specific portion of the display 151, electrostatic capacitance occurring at a specific portion of the display 151, etc. into an electrical input signal. The touch sensor may be configured to sense pressure at the time of touch as well as a touched position and area.

In the case in which there is a touch input to the touch sensor, a corresponding signal(s) is sent to a touch controller. The touch controller processes the signal(s) and transmits corresponding data to the controller 180. Thus, the controller 180 can determine which area of the display 151 has been touched.

The proximity sensor may be positioned in an internal area of the mobile terminal, which is surrounded by the touch screen, or near the touch screen. The proximity sensor refers to a sensor for sensing objects approaching a specific detection surface or whether objects exist nearby without mechanical contact by employing electromagnetic force or infrared rays. The proximity sensor has a longer lifespan than that of a contact type sensor and also has increased efficiency.

Examples of the proximity sensor may include a transmit type photoelectric sensor, a direct reflection type photoelectric sensor, a mirror reflection type photoelectric sensor, a high frequency oscillation type proximity sensor, an electrostatic capacitance type proximity sensor, a magnetic type proximity sensor, an infrared proximity sensor, and so on.

In the case in which the touch screen is an electrostatic type, the touch screen is configured to sense the proximity of a pointer based on a change in electric field according to the proximity of the pointer. In this case, the touch screen (touch sensor) may be classified as a proximity sensor.

The proximity sensor is configured to sense a proximity touch action and a proximity touch pattern (including, for example, a proximity touch distance, a proximity touch direction, a proximity touch speed, a proximity touch time, a proximity touch position, a proximity touch moving status, etc.). Information corresponding to the sensed proximity touch operation and the proximity touch pattern may be output on a touch screen.

The audio output module 152 may output audio data, which is received from the wireless communication unit 110 or stored in the memory 160, in various modes including call-receiving mode, call-placing mode, recording mode, voice recognition mode and broadcast reception mode. The audio output module 152 outputs audio relating to a particular function (e.g., call received and message received), which is performed in the mobile terminal 100. The audio output module 152 may be implemented using receivers, speakers, buzzers, and so on.

The alarm unit 153 outputs signals to inform the occurrence of events in the mobile terminal 100. For example, the events occurring in the mobile terminal may include signals, including call-received and message-received, a key entry signal, a touch input, and so on. The alarm unit 153 may also output signals to inform the occurrence of events in different ways other than the audio or video signal, for example, through vibration. The video signal or the audio signal may also be output through the display 151 or the audio output module 152.

The haptic module 154 generates a variety of haptic effects which can be felt by a user. One of representative examples of the haptic effects, which are generated by the haptic module 154, includes a vibration effect. The intensity, pattern, etc. of vibration generated by the haptic module 154 can be controlled. For example, different vibrations may be combined or output or sequentially output.

The haptic module 154 may generate various haptic effects, for example, an effect caused by the stimulus of arrangement of pins, which move vertically to a contact skin surface, an effect caused by a stimulus through spraying force or suction force by the air through an injection nozzle or an inlet, an effect caused by a stimulus passing over the skin surface, an effect caused by a stimulus through the contact of an electrode, an effect caused by a stimulus employing electrostatic force, and an effect caused by the reappearance of a feeling of cold and warmth employing an element that may absorb or generate heat, as well as the vibration effect.

The haptic module 154 may be implemented to not only transfer the haptic effects through a direct contact, but also make the haptic effects felt through myestheia of a user's finger, arm, etc. Two or more haptic modules 154 may be included according to a configuration aspect of the mobile terminal 100.

The memory 160 may be configured to store programs for processing an overall control operation of the controller 180, including a control program of a three-dimensional user interface to be described later on, and also temporarily store input/output data, for example, phonebook data, messages, pictures, video, etc. The memory 160 may store authorization information and terminal information of the information device 200 from which transmission of authorization information is permitted. The memory 160 may also store data relating to various patterns of vibrations and sounds, which are output at the time of touch entry on a touch screen.

The memory 160 may include at least one type of storage media, including a flash memory type, a hard disk type, a multimedia card microphone type, card type memory (for example, SD or XD memory, etc.), random access memory (RAM), static random access memory (SRAM), read-only memory (ROM), electrically erasable programmable read-only memory (EEPROM), programmable read-only memory (PROM) magnetic memory, magnetic disk, and optical disk. The mobile terminal 100 may also operate in association with a web storage that performs a storage function of the memory 160 on the Internet.

The interface unit 170 is often implemented to couple the mobile terminal 100 with external devices. The interface unit 170 is configured to receive data or power from the external devices and transfer the data or power to each component within the mobile terminal 100 or transmit data within the mobile terminal 100 to the external devices. For example, a wired/wireless headset port, an external charger port, a wired/wireless data port, a memory card port, an identity module card port, an audio input/output (I/O) port, a video I/O port, an earphone port, and so on may be included in the interface unit 170.

The identity module is a chip that stores various pieces of information for authenticating use authority of the mobile terminal 100 and may include a user identify module (UIM), a subscriber identify module (SIM), a universal subscriber identity module (USIM) and the like. An apparatus equipped with an identity module (hereinafter referred to as an 'identity device') may be fabricated in a smart card form. Accordingly, the identity device may be connected to the mobile terminal 100 via the identity module port of the interface unit 170. The identity module stores telephone numbers, phone call information, billing information, etc.

The interface unit 170 may become a passage through which power source from an external cradle is supplied to the mobile terminal 100 when the mobile terminal 100 is coupled to the cradle or a passage through which a variety of command signals input from the cradle are transferred to the mobile terminal 100 by a user. The variety of command signals or power source input from the cradle may operate as signals to recognize that the mobile terminal has been mounted in the cradle accurately.

The controller 180 controls the overall operations of the mobile terminal 100. For instance, the controller performs the control and processing associated with voice calls, data communications, and video calls. The controller 180 may include a multimedia module 181 for multimedia playback and an authorization information processing module for processing authorization information. The multimedia module 181 may be implemented within the controller 180 or separately from the controller 180. The authorization information processing module is configured to transmit authorization information to the information device 200 through the short-range communication module when a short-range communication channel is formed between the mobile terminal 100 and the information device 200. Further, the authorization information processing module may create, update or delete authorization information on the basis of a command and data input from the information device 200, or a command and data input from the user input unit 130 of the mobile terminal 100.

The controller 180 may perform a pattern recognition processing in which writing entry or drawing entry performed on a touch screen can be recognized as text and images.

The power supply 190 provides internal power source and/or external power source required by various components under the control of the controller 180.

The various embodiments described herein may be implemented in a recording medium readable by a computer or its similar devices by employing, for example, software, hardware or some combinations thereof.

For a hardware implementation, the embodiments described herein may be implemented within at least one of application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein or a selective combination thereof. In some cases, the embodiments may be implemented by the controller 180.

For a software implementation, the embodiments such as procedures and functions may be implemented with separate software modules, each of which performs one or more of the functions and operations described herein. Software codes may be implemented using a software application written in any suitable programming language. The software codes may be stored in the memory 160 and executed by the controller 180.

Figure 3A:
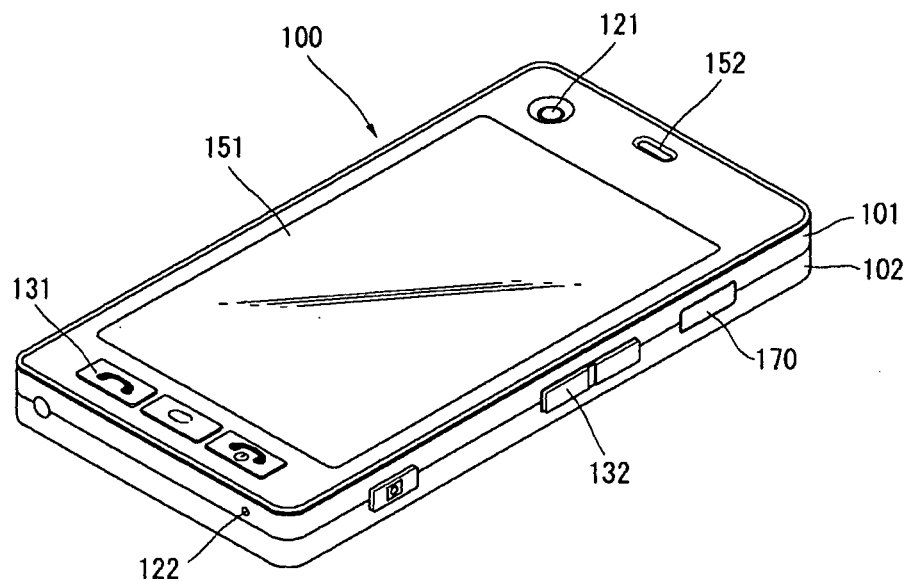
FIG. 3A is a perspective view of a front side of a handheld terminal related to an embodiment of the exemplary embodiment.

FIG. 3A is a perspective view of a front side of a mobile terminal according to an embodiment of the exemplary embodiment.

The mobile terminal 100 is equipped with a bar-type terminal body. The exemplary embodiment is not limited to the above example, but may be applied to a variety of configurations in which two or more bodies are coupled in such a way as to move relative to each other, such as slide-type, folder-type, swing-type and swivel-type, and combinations thereof.

A body includes a case (a casing, a housing, a cover, and so on) constituting an external appearance of the mobile terminal. In the present embodiment, the case may be divided into a front case 101 and a rear case 102. A variety of electronic components are built in space formed between the front case 101 and the rear case 102. At least one intermediate case may be further disposed between the front case 101 and the rear case 102.

The cases may be fabricated by injecting synthetic resin or may be fabricated to have metal materials such as stainless steel (STS) or titanium (Ti).

The display 151, the audio output unit 152, the camera 121, a plurality of manipulation units 131 and 132, the microphone 122, the interface unit 170, and so on may be disposed in the terminal body, mainly, the front case 101.

The display 151 occupies the greater part of a main surface of the front case 101. The audio output unit 152 and the camera 121 are disposed in an area adjacent to one of both ends of the display 151, and the first manipulation unit 131 and the microphone 122 are disposed in an area adjacent to the other of both ends of the display 151. The second manipulation unit 132, the interface unit 170, etc. are disposed on the sides of the front case 101 and the rear case 102.

The user input unit 130 is manipulated in such a way as to receive commands for controlling the operations of the mobile terminal 100 and may include the plurality of manipulation units 131 and 132.

The manipulation units 131 and 132 may be collectively called a manipulating portion and may adopt any kind of a method as long as it is a tactile manner, which allows a user to manipulate the manipulation units 131 and 132 while feeling a tactile sense.

Contents input by the manipulation units 131 and 132 may be set in various ways. For example, the first manipulation unit 131 may be configured to receive commands, such as start, stop, and scroll, and the second manipulation unit 132 may be configured to receive commands, such as a volume control of audio output from the audio output unit 152 or switching of the display 151 to a touch recognition mode.

Figure 3B:
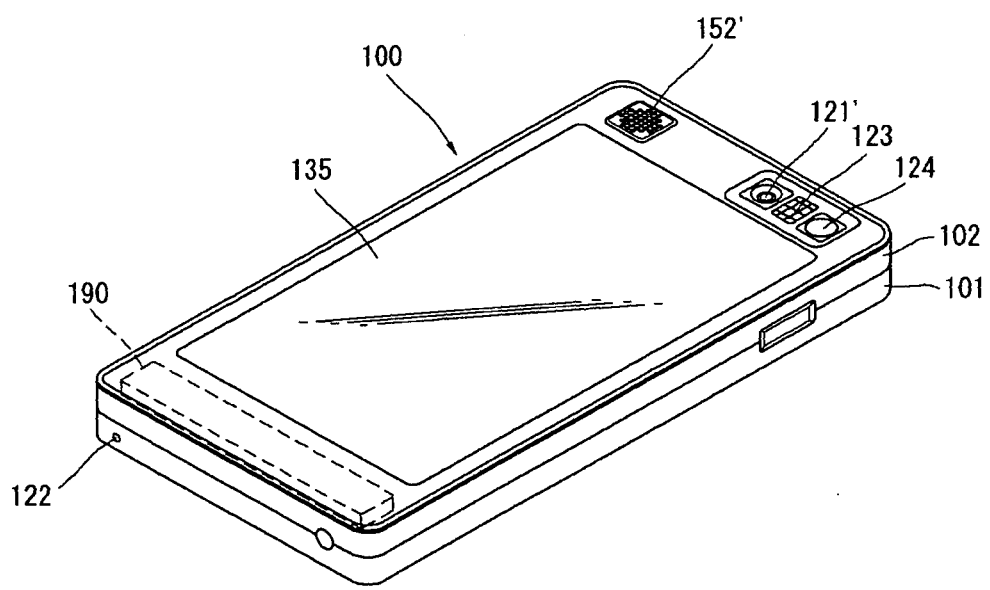
FIG. 3B is a perspective view of a rear side of a handheld terminal related to an embodiment of the exemplary embodiment.

FIG. 3B is a perspective view of a rear side of the mobile terminal 100.

Referring to FIG. 3B, a camera 121' may be further mounted to a rear side of the terminal body, i.e., the rear case 102. The camera 121' may be a camera, which faces a direction that is substantially opposite to a direction faced by the camera 121 (refer to FIG. 2A) and has pixels different from that of the camera 121.

For example, the camera 121 may operate with a relatively lower resolution sufficiently enough to capture an image of a user's face and transmit the captured image to a counterpart in video calls or the like. The camera 121' may operate with a relatively higher resolution, which is useful for obtaining higher quality pictures for later use or for communicating to others. The cameras 121 and 121' may be installed in the terminal body such that they can be rotated or popped up.

A flash 123 and a mirror 124 may be further disposed adjacent to the camera 121'. The flash 123 irradiates light to a subject when the subject is photographed by the camera 121'. The mirror 124 is useful for assisting a user to position the camera 121 in a self-portrait mode.

An audio output unit 152' may be further disposed on the rear side of the terminal body. The audio output unit 152' may implement a stereo function together with the audio output unit 152 (refer to FIG. 2a) of the front side and may be used to implement a speakerphone mode at the time of calls.

A broadcast signal receiving antenna other than an antenna for calls, etc. may be further disposed on the side of the terminal body. The antenna, constituting a part of the broadcast receiving module 111 of FIG. 1, may be configured to retract into the terminal body.

The power supply 190 for supplying power to the mobile terminal 100 may be mounted in the terminal body. The power supply 190 may be configured internally or externally to the terminal body so that it is directly detachable therefrom.

A touch pad 135 for sensing touch may be further mounted in the rear case 102. The touch pad 135 may also be configured in a light-transmitting type like the display 151. In this case, in the case in which the display 151 is configured to output sight information from its both sides, the sight information can also be recognized even through the touch pad 135. Information output to the both sides of the display 151 may be controlled by the touch pad 135. Unlike the above, a display may be further mounted in the touch pad 135 and, therefore, a touch screen may be disposed in the rear case 102.

The touch pad 135 may operate in association with the display 151 of the front case 101. The touch pad 135 may be disposed in parallel to the display 151 in the rear of the display 151. The touch pad 135 may have a size which is identical to or smaller than that of the display 151.

Figure 4:
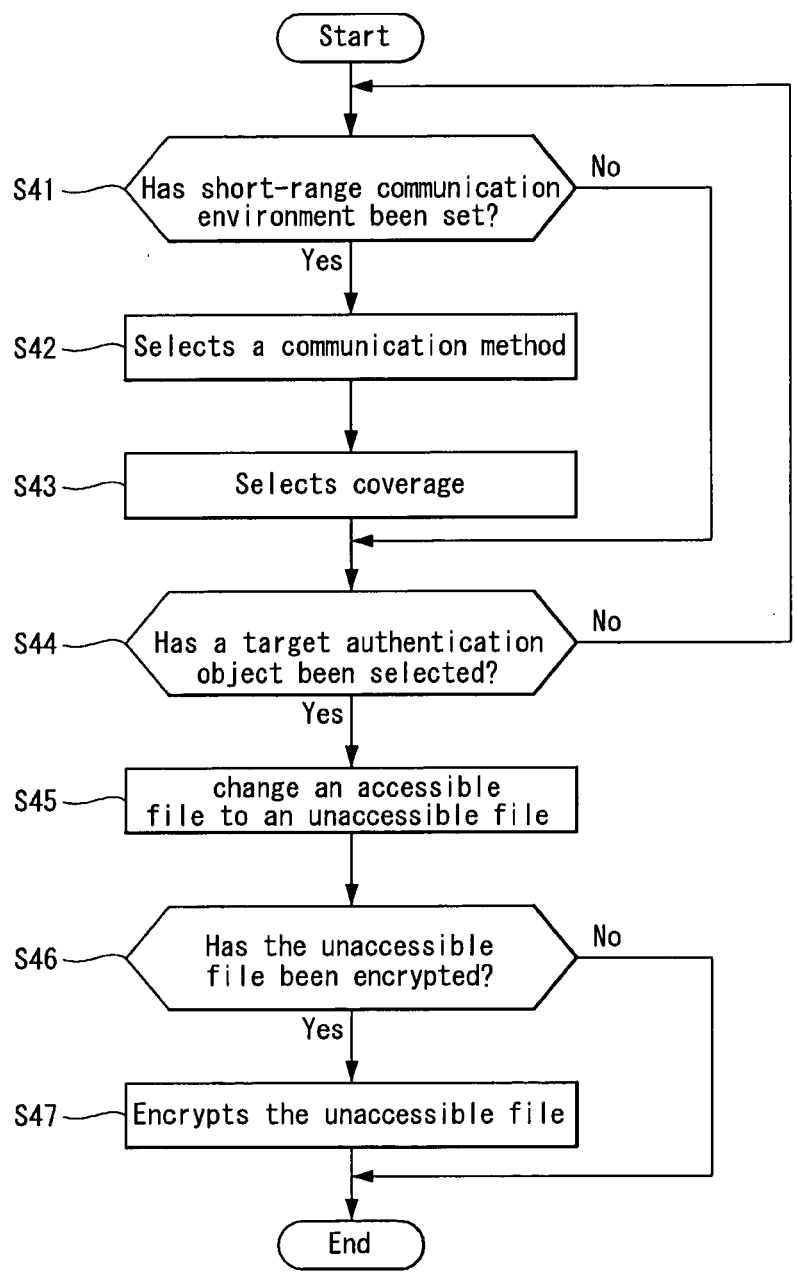
FIG. 4 is a flowchart showing, in stages, a control sequence of a method of setting access and unaccess of information stored in an information device in the system for restricting the disclosure of information and a method of setting short-range communication.

FIG. 4 is a flowchart showing, in stages, a control sequence of a method of setting access and unaccess of information stored in the information device 200 in the system for restricting the disclosure of information and a method of setting short-range communication. This method may be performed under the control of the control module within the information device 200.

Referring to FIG. 4, a user sets a short-range communication environment according to the guidance of a menu displayed in the information device 200 (S41 to S43) and selects a target authentication file (S44).

The user may select a communication method and coverage in the short-range communication environment of the information device 200 (S41 to S43). A short-range communication coverage 300 is a physical distance in which authorization information is received in the information device 200 and the mobile terminal 100 as shown in FIG. 1. When the short-range communication coverage 300 is designated by the user, the control module of the information device detects the intensity of a receiving signal received from the short-range communication module and determines whether the mobile terminal 100 exists within the coverage 300 or outside the coverage 300 by comparing the received signal intensity and a threshold value, which has been set in response to the coverage.

If the short-range communication coverage 300 is designated, although authorization information is received from the mobile terminal 100, which exists outside the coverage 300, to the information device 200, the control module of the information device determines the corresponding authorization information as invalid authorization information without a comparison and verification process with authorization information stored therein. Accordingly, if the coverage 300 of the short-range communication is designated, although valid authorization information is received from the mobile terminal 100 outside the coverage 300, the control module does not change unaccessible information, which has been previously designated by a user, to accessible information.

If a user does not designate a short-range communication environment, the control module of the information device 200 S activates channels of the entire communication methods, which can be received in the short-range communication module, and does not restrict the coverage.

The user may select target authentication information by employing the input device module while viewing an information file list displayed on the information device (S44). The selected information files are treated as unaccessible information by the control module, so that the attributes of the information files are automatically changed to 'hiding'. The unaccessible information is stored in the memory module of the information device, but is not seen on a display screen.

The user may select encryption with respect to the unaccessible information files selected in step S45 (S46). If the user selects the unaccessible information to be encrypted, the encryption module of the information device encrypts the selected unaccessible information (S47).

The attribute of the unaccessible information, which has not been encrypted, is automatically changed to a 'read and write' attribute so that the unaccessible information can be displayed on a monitor, etc. without experiencing a decryption process when authorization information of a valid mobile terminal 100 is received by the information device through a short-range communication channel. The encrypted unaccessible information is automatically decrypted by the encryption module when the authorization information of the valid mobile terminal 100 is received by the information device 200 through the short-range communication channel and has its attribute automatically changed to a 'read and write' attribute.

A user may input a password, which will be input when changing unaccessible information to accessible information, to the information device 200. In this case, if a password input through the input device of the information device 200 is not valid although authorization information received from the mobile terminal 100 is valid, the information device 200 does not change unaccessible information to accessible information. In other words, if a password has been set to unaccessible information, the unaccessible information can be changed to accessible information only when authorization information received from the mobile terminal 100 and a password separately input by a user are all valid.

Figure 5:
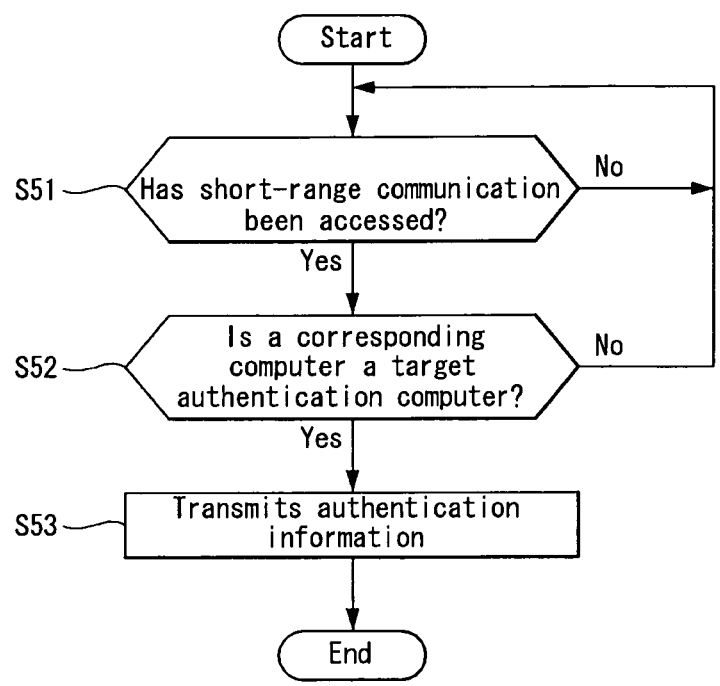
FIG. 5 is a flowchart showing, in stages, a control sequence of transmitting authorization information of a mobile terminal.

FIG. 5 is a flowchart showing, in stages, a control sequence of transmitting authorization information of the mobile terminal 100 in the system for restricting the disclosure of information. This method is controlled by the controller 180 of the mobile terminal 100.

Referring to FIG. 5, when a short-range communication channel with the information device 200 is established (S51), the mobile terminal 100 determines whether the information device 200 is allowed to transmit authorization information by comparing terminal information of the information device 200 with terminal information stored in the memory through the short-range communication channel (S52).

If, as a result of the determination in step S52, the information device 200 has been determined as an object designated to transmit the authorization information, the mobile terminal 100 transmits encrypted authorization information to the information device 200 through the short-range communication channel (S53).

FIGS. 6 to 11 are flowcharts showing, in stages, unaccessible information processing of the information device 200 according to various embodiments of the exemplary embodiment. The embodiments of FIGS. 6 to 11 are under control of the control module of the information device 200.

Figure 6:
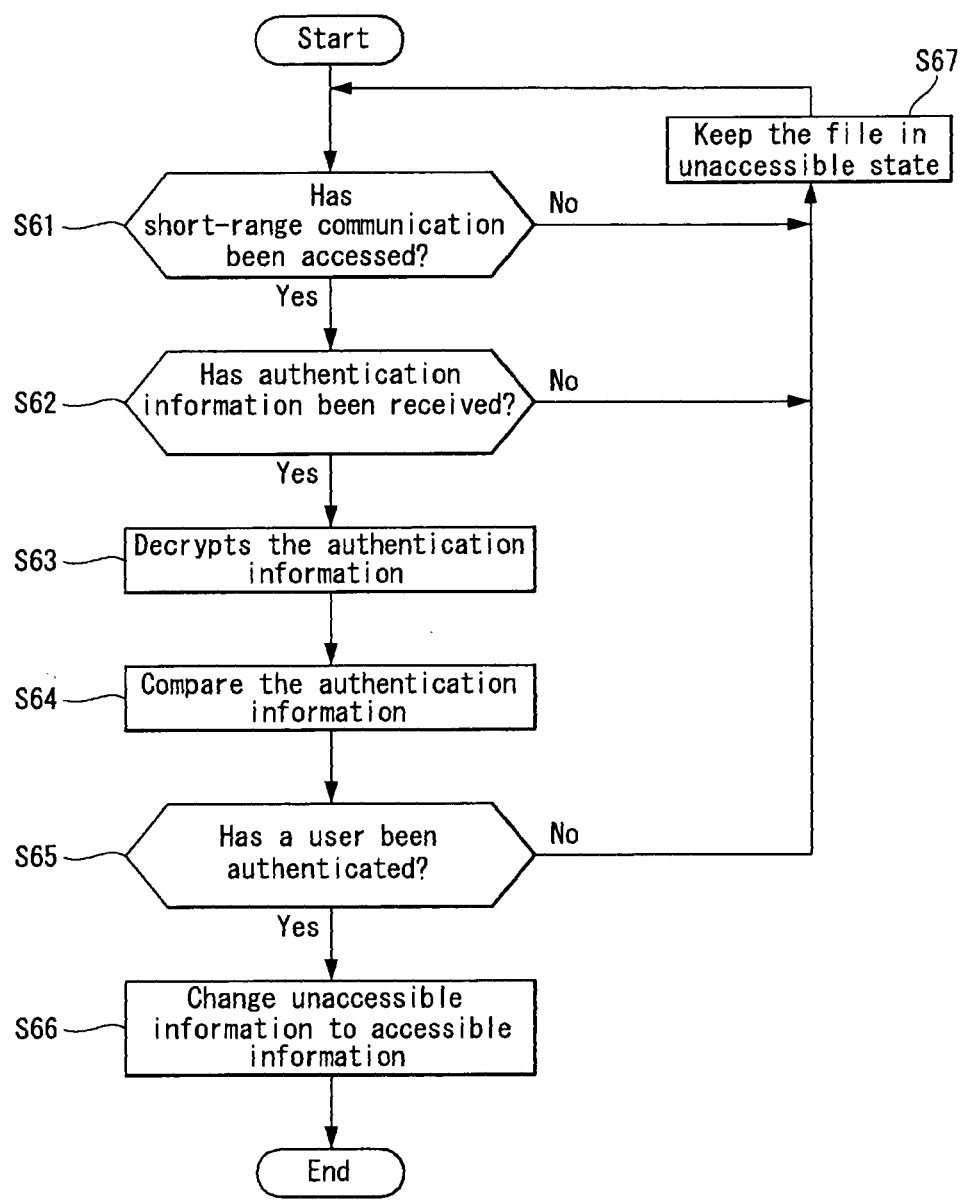
FIG. 6 is a flowchart showing, in stages, a control sequence of a method of processing unaccessible information according to a first embodiment of the exemplary embodiment.

Referring to FIG. 6, in a unaccessible information processing method according to a first embodiment of the exemplary embodiment, when a short-range communication channel is established between the information device 200 and the mobile terminal 100 (S61), the information device 200 receives authorization information from the mobile terminal 100 (S62).

The encryption module of the information device 200 decrypts the authorization information by employing a key included in the authorization information (S63) and compares terminal information, included in the authorization information, and terminal information previously stored in the memory module in order to verify the validity of the authorization information (S64 and S65).

If the authorization information is valid, i.e., user authentication is completed (S65), the information device 200 changes unaccessible information of the user to accessible information (S66). If the authorization information is not valid, the information device 200 keeps the unaccessible information in unaccessible state (S67).

Figure 7:
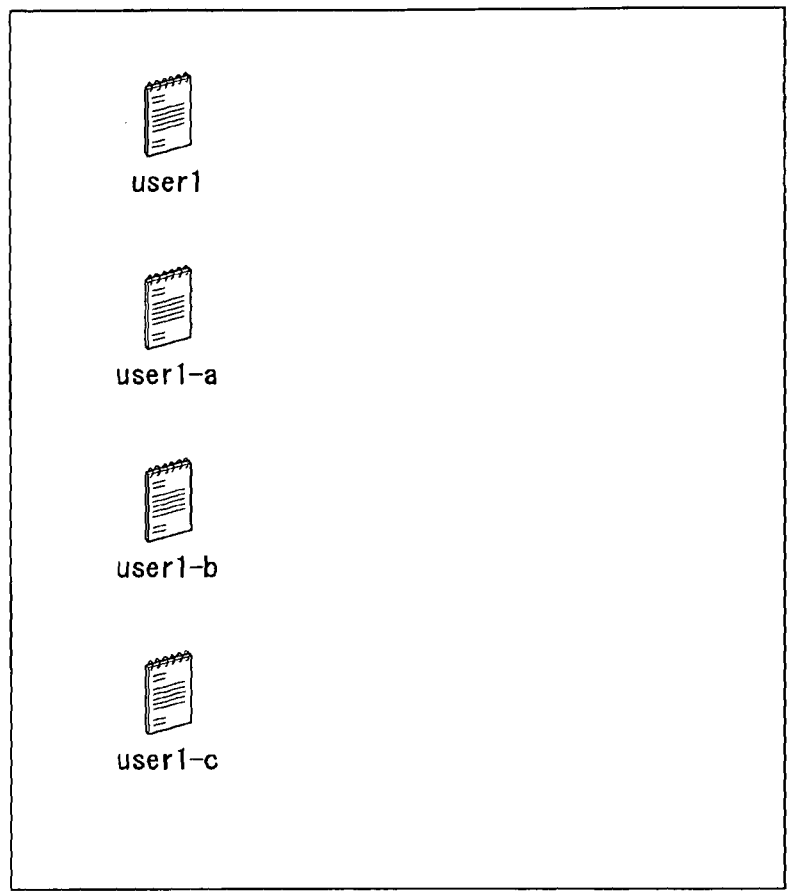
FIG. 7 is a diagram showing an example in which accessible information files of a computer are displayed on an OS desktop screen.

Unaccessible information that has not been encrypted in step S66 is immediately changed to accessible information without a decryption process, and encrypted unaccessible information is decrypted by the encryption module of the information device and then changed to accessible information. FIG. 7 shows an example of text files changed from unaccessible information to accessible information. Text files designated as unaccessible information are not seen on the display of the information device, but are displayed on the display after the text files are changed to accessible information.

As can be seen from FIG. 6, a user can change unaccessible information to accessible information automatically by only disposing the mobile terminal 100 near the information device 200 within a distance where short-range communications are possible. Unwanted reading, modification, deletion, copy, etc. of personal information requiring security can be prevented through this method.

Figure 8:
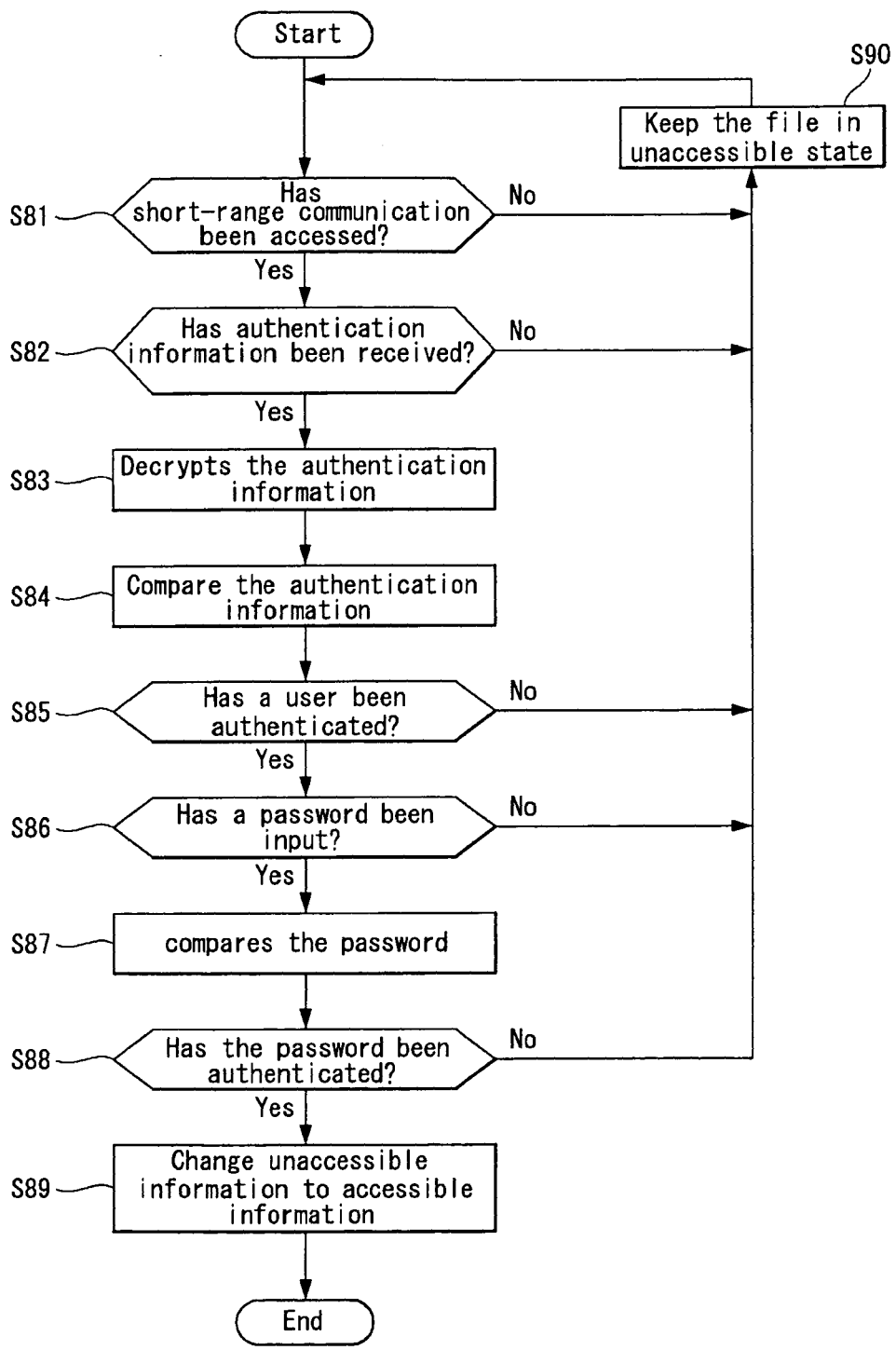
FIG. 8 is a flowchart showing, in stages, a control sequence of a method of processing unaccessible information according to a second embodiment of the exemplary embodiment.

Referring to FIG. 8, in a unaccessible information processing method according to a second embodiment of the exemplary embodiment, when a short-range communication channel is established between the information device 200 and the mobile terminal 100 (S81), the information device 200 receives authorization information from the mobile terminal 100 (S82).

The encryption module of the information device 200 decrypts the authorization information by employing a key included in the authorization information (S83) and compares terminal information, included in the authorization information, and terminal information previously stored in the memory module in order to verify the validity of the authorization information (S84 and S85).

If the authorization information is valid, i.e., user authentication is completed (S85), the information device 200 displays a password entry window on the display in order to induce the input of a password. When a password is input by a user, the information device 200 verifies the validity of the input password by comparing the input password and a user password stored in the memory module. If, as a result of the verification, the input password is valid, the information device 200 changes unaccessible information of the user to accessible information (S86 to S89). However, when both the authorization information and the password are not valid, the information device 200 keeps the unaccessible information in unaccessible state (S90).

Unaccessible information that has not been encrypted in step S89 is immediately changed to accessible information without a decryption process, and encrypted unaccessible information is decrypted by the encryption module of the information device and then changed to accessible information. FIG. 7 shows an example of text files changed from unaccessible information to accessible information. Text files designated as unaccessible information are not seen on the display of the information device, but are displayed on the display after the text files are changed to accessible information.

Meanwhile, there may exist a number of mobile terminals, which request authentication through short-range communication channels, near the information device 200. In this case, the information device 200 may prompt a user to select information to be accessible state. This control method is described with reference to FIGS. 9 to 11.

Figure 9:
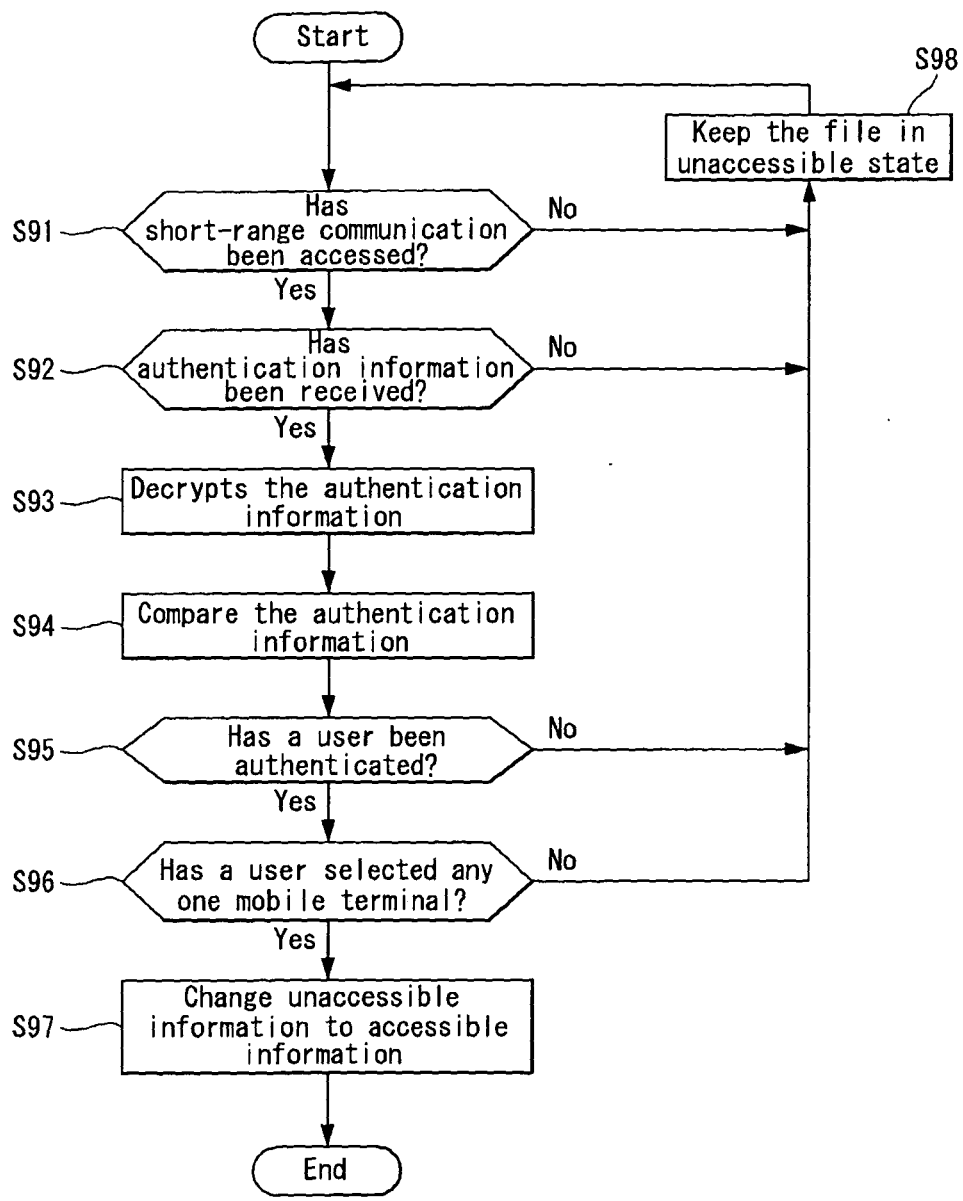
FIG. 9 is a flowchart showing, in stages, a control sequence of a method of processing unaccessible information according to a third embodiment of the exemplary embodiment.

Referring to FIG. 9, steps S91 to S94 are substantially the same as those of FIG. 6, and detailed description thereof is omitted for simplicity.

In a unaccessible information processing method according to a third embodiment of the exemplary embodiment, when a number of the mobile terminals 100 connect to the information device 200 at the same time through short-range communication channels and all pieces of authorization information of the mobile terminals is determined to be valid, the information device 200 induces a user's selection.

Figure 10:
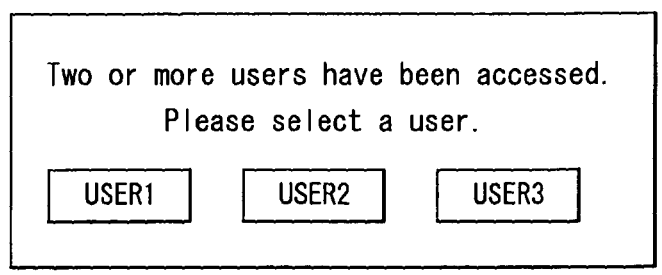
FIG. 10 is a diagram showing an example of a user selection window when a number of mobile terminals access an information device through a short-range communication channel.

The control module of the information device 200 displays a user selection window as shown in FIG. 10, which prompts the user to select any one of the accessed mobile terminals, on the display (S95 and S96). After the user' selection is completed, the control module of the information device 200 changes unaccessible information files of the selected user to accessible information (S97).

Figure 11:
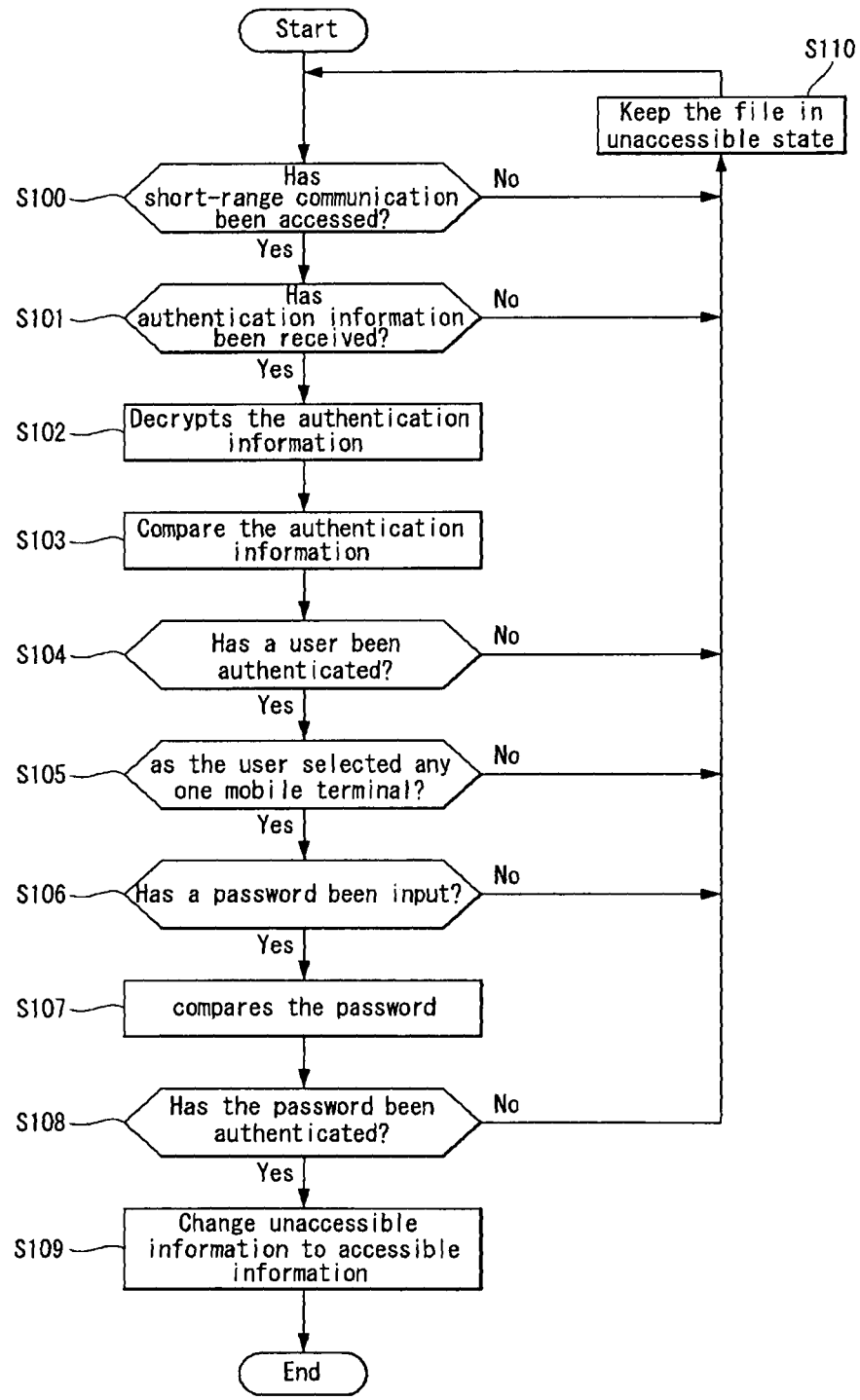
FIG. 11 is a flowchart showing, in stages, a control sequence of a method of processing unaccessible information according to a fourth embodiment of the exemplary embodiment.

Referring to FIG. 11, steps S100 to S103 are substantially the same as those of FIG. 8, and detailed description thereof is omitted for simplicity.

In a unaccessible information processing method according to a fourth embodiment of the exemplary embodiment, like the above third embodiment, when a number of the mobile terminals 100 connect to the information device 200 at the same time through short-range communication channels and all pieces of authorization information of the mobile terminals is determined to be valid, the information device 200 induces a user's selection.

The control module of the information device 200 displays a user selection window as shown in FIG. 10, which prompts the user to select any one of the accessed mobile terminals, on the display (S104 and S105). After the user' selection is completed, the control module of the information device 200 verifies the user's password. If the user's password is valid, the control module changes unaccessible information files selected by the user to accessible information (S106 to S109).

The system and method for restricting the disclosure of information employing a mobile terminal according to the embodiments of the exemplary embodiment may be recorded as a program for being executed in a computer in a computer-readable recording medium and then provided.

The system and method for restricting the disclosure of information employing a mobile terminal according to the embodiments of the exemplary embodiment may be executed through software. When the system and method is executed through software, constituent means of the exemplary embodiment are code segments that execute necessary tasks. The program or code segments may be stored in a processor-readable medium, or transmitted through a transmission medium or by a computer data signal coupled with carriers in a communication network.

Computer-readable recording media include all kinds of recording devices in which data capable of being read by a computer system is stored. For example, the computer-readable recording media may include ROM, RAM, CD-ROM, DVD-ROM, DVD-RAM, magnetic tapes, floppy disks, hard disks, optical data storages, and so on. The computer-readable recording media may also be stored and executed as codes, which are distributed into computer apparatuses connected over a network and readable by computers in a distributed manner.

It will be apparent to those skilled in the art that various modifications and variations can be made in the exemplary embodiment without departing from the spirit or scope of the inventions. Thus, it is intended that the exemplary embodiment covers the modifications and variations of this invention provided they come within the scope of the appended claims and their equivalents.

What is claimed is:

1. A mobile terminal for accessing an information device through a short-range communication channel, the mobile terminal comprising:
a short-range communication module configured to establish the short-range communication channel;
a memory configured to store authorization information for changing an attribute of an information file stored in the information device from a hidden state to a visible state or from an unaccessible state to an accessible state according to a distance between the information device and the mobile terminal, wherein the distance is a relative distance determined with reference to a location of the information device,
wherein, when the information file is in the hidden state, an item indicating that the information file is stored in the information device is not visible on a display of the information device,
wherein, when the information file is in the visible state, the item is visible on the display of the information device, and
wherein, when the information file is in the unaccessible state, both the mobile terminal and the information device are restricted from access to the information file; and
a controller for controlling the short-range communication module to transmit the authorization information when the mobile terminal is located within an effective reception distance of the short-range communication module with reference to a location of the information device,
wherein, when a physical distance for authorization of the mobile terminal is designated by a user to be shorter than an effective reception distance of the short-range communication channel, the changing of the attribute of the information file is restricted even though the transmitted authorization information is valid, if the information device receives the authorization information from the mobile terminal located at a distance between the designated physical distance and the effective reception distance of the short-range communication channel.

2. The mobile terminal as claimed in claim 1, wherein the authorization information includes terminal information of the mobile terminal and a key for decrypting the information file.

3. The mobile terminal as claimed in claim 1, wherein the controller comprises an encryption module for encrypting the authorization information.

4. An information device comprising:
a display configured to display information;
a short-range communication module configured to establish a short-range communication channel for communication with a mobile terminal; and
a control module configured to change an attribute of an information file stored in the information device from a hidden state to a visible state or from an unaccessible state to an accessible state according to a distance between the information device and the mobile terminal wherein the distance is a relative distance determined with reference to a location of the information device,
wherein the control module is configured to receive authorization information from the mobile terminal when the mobile terminal is located within an effective reception distance of the short-range communication module with reference to a location of the information device,
wherein, when the information file is in the hidden state, an item indicating that the information file is stored in the information device is not displayed on the display,
wherein, when the information file is in the visible state, the item is displayed on the display, and
wherein, when the information file is in the unaccessible state, both the mobile terminal and the information device are restricted from access to the information file,
wherein the control module is further configured to restrict changing of the attribute of the information file even though valid authorization information is received from the mobile terminal, if it is determined that the mobile terminal is located at a distance between a physical distance designated by a user and the effective reception distance of the short-range communication module, and
wherein the physical distance designated by the user is shorter than the effective reception distance of the short-range communication module.

5. The information device as claimed in claim 4, wherein the control module comprises an encryption module configured to encrypt the information file and decrypt the encrypted information file using a key included in the authorization information in response to the receipt of the authorization information.

6. The information device as claimed in claim 4, further comprising a memory configured to store terminal information of the mobile terminal.

7. The information device as claimed in claim 6, wherein the control module is further configured to verify a validity of the authorization information by comparing terminal information of the mobile terminal, which is included in the authorization information, to the stored terminal information.

8. The information device as claimed in claim 7, wherein the memory is further configured to store user passwords.

9. The information device as claimed in claim 8, wherein the control module is further configured to verify a validity of an input password by comparing the input password to the stored user passwords, and change the attribute of the information file if the validity of the authorization information and the validity of the input password are verified.

10. The information device as claimed in claim 4, wherein, when it is determined that authorization information is received via the short-range communication channel from each of a plurality of mobile terminals, the control module is further configured to change an attribute of an information file corresponding to the authorization information from a selected mobile terminal of the plurality of mobile terminals.

11. The information device as claimed in claim 4, wherein the control module is further configured to change the attribute of the information file if a received signal intensity corresponding to the receipt of the authorization information is greater than a specific threshold value.

12. The information device as claimed in claim 4, wherein:
playback, transfer, and copy of the information file are prohibited when the attribute of the information file is set to "hiding"; and
playback, transfer, and copy of the information file are allowed when the attribute of the information file is set to "read and write".

13. A method of restricting access to an information file stored in an information device having a short-range communication module, the method comprising:
- establishing, by the short-range communication module, a short-range communication channel for communication with a mobile terminal;
- receiving, by the information device, authorization information via the short-range communication channel when the mobile terminal is located within an effective reception distance of the short-range communication module, the authorization information for changing an attribute of the information file from a hidden state to a visible state or from an unaccessible state to an accessible state according to a distance between the information device and the mobile terminal, wherein the distance is a relative distance determined with reference to a location of the information device,
- wherein, when the information file is in the hidden state, an item indicating that the information file is stored in the information device is not displayed on a display of the information device,
- wherein, when the information file is in the visible state, the item is displayed on the display of the information device, and
- wherein, when the information file is in the unaccessible state, both the mobile terminal and the information device are restricted from access to the information file;
- changing, by the information device, the attribute of the information file in response to receiving the authorization information; and
- restricting, by the information device, the changing of the attribute of the information file even though valid authorization information is received from the mobile terminal, if it is determined that the mobile terminal is located at a distance between a physical distance designated by a user and the effective reception distance of the short-range communication channel with reference to a location of the information device, and
- wherein the physical distance designated by the user is shorter than the effective reception distance of the short-range communication channel.

14. The method as claimed in claim 13, further comprising:
- encrypting, by the information device, the information file; and
- decrypting, by the information device, the encrypted information file using a key included in the received authorization information.

15. The method as claimed in claim 13, further comprising verifying validity of the authorization information by comparing terminal information of the mobile terminal, which is included in the received authorization information, to terminal information stored in a memory of the information device.

16. The method as claimed in claim 13, further comprising:
- verifying validity of the authorization information by comparing terminal information of the mobile terminal, which is included in the received authorization information, to terminal information stored in a memory of the information device; and
- verifying validity of an input password by comparing the input password to a user password stored in the memory of the information device,
- wherein changing the attribute of the information file comprises changing the attribute of the information file if the validity of the authorization information and the validity of the input password are verified.

17. The method as claimed in claim 13, wherein, when it is determined that authorization information is received via the short-range communication channel from each of a plurality of mobile terminals, changing the attribute of the information file comprises changing an attribute of an information file corresponding to the authorization information from a selected mobile terminal of the plurality of mobile terminals.

18. The method as claimed in claim 13, wherein changing the attribute of the information file comprises changing the attribute of the information file if a received signal intensity corresponding to the received authorization information is greater than a specific threshold value.

19. The method as claimed in claim 13, wherein:
- playback, transfer, and copy of the information file are prohibited when the attribute of the information file is set to "hiding"; and
- playback, transfer, and copy of the information file are allowed when the attribute of the information file is set to "read and write".

* * * * *